(12) United States Patent
Davis

(10) Patent No.: US 11,488,433 B2
(45) Date of Patent: Nov. 1, 2022

(54) METHOD AND SYSTEM FOR PUBLIC ELECTIONS ON A MODERATED BLOCKCHAIN

(71) Applicant: Mastercard International Incorporated, Purchase, NY (US)

(72) Inventor: Steven Charles Davis, Saint Peters, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 131 days.

(21) Appl. No.: 15/868,515

(22) Filed: Jan. 11, 2018

(65) Prior Publication Data

US 2019/0213821 A1 Jul. 11, 2019

(51) Int. Cl.
*G07C 13/00* (2006.01)
*H04L 9/14* (2006.01)
(Continued)

(52) U.S. Cl.
CPC ............ *G07C 13/00* (2013.01); *H04L 9/0861* (2013.01); *H04L 9/14* (2013.01); *H04L 9/30* (2013.01);
(Continued)

(58) Field of Classification Search
CPC ..... G07C 13/00; H04L 9/0637; H04L 9/0861; H04L 9/14
See application file for complete search history.

(56) References Cited

U.S. PATENT DOCUMENTS 6,092,051 A * 7/2000 Kilian .................... G07C 13/00
380/28
6,845,447 B1 * 1/2005 Fujioka .................. G06Q 30/02
705/12
(Continued)

FOREIGN PATENT DOCUMENTS

JP 2007323214 A * 12/2007 ........... G06F 21/604

OTHER PUBLICATIONS

Ahmed Ben Ayed, Blockchain-Based Voting System, May 2017, Department of Engineering and Computer Science, Colorado Technical University, vol. 9, No. 3 (Year: 2017).*
(Continued)

*Primary Examiner* — Jacob C. Coppola
*Assistant Examiner* — Terry Nathan Murray
(74) *Attorney, Agent, or Firm* — Panitch Schwarze Belisario & Nadel LLP

(57) ABSTRACT

A method for processing votes in a public blockchain includes: generating an election reference and candidate references; generating an asymmetric cryptographic key pair comprised of a master private key and master public key; generating a registration block for addition to a blockchain including the election reference, candidate references, and master public key; transmitting the registration block to nodes associated with the blockchain; receiving a plurality of voting messages, each including a vote and the election reference, where the vote includes a voter reference and at least one candidate reference; generating one or more voting blocks for addition to the blockchain including the received votes; and transmitting each generated voting block to nodes associated with the blockchain.

18 Claims, 6 Drawing Sheets

(51) Int. Cl.
*H04L 9/08* (2006.01)
*H04L 9/32* (2006.01)
*H04L 9/30* (2006.01)
*H04L 9/00* (2022.01)

(52) U.S. Cl.
CPC .......... *H04L 9/3239* (2013.01); *H04L 9/3247* (2013.01); *G06Q 2220/10* (2013.01); *H04L 9/50* (2022.05); *H04L 2209/463* (2013.01)

(56) References Cited

U.S. PATENT DOCUMENTS

| | | | |
|---|---|---|---|
| 10,050,786 B2* | 8/2018 | Chaum | H04L 9/30 |
| 2001/0034640 A1* | 10/2001 | Chaum | G07C 13/00 |
| | | | 705/12 |
| 2009/0179071 A1 | 7/2009 | Backed et al. | |
| 2012/0144186 A1* | 6/2012 | Puiggali | H04L 9/3013 |
| | | | 713/150 |
| 2014/0089062 A1* | 3/2014 | Chen | G07C 13/00 |
| 2017/0046689 A1* | 2/2017 | Lohe | G06Q 50/01 |
| 2017/0109955 A1* | 4/2017 | Ernest | G07C 13/00 |
| 2017/0207917 A1 | 7/2017 | Davis | |
| 2017/0344580 A1 | 11/2017 | King | |
| 2017/0352219 A1 | 12/2017 | Spanos et al. | |
| 2018/0331832 A1* | 11/2018 | Pulsifer | G06Q 50/01 |

OTHER PUBLICATIONS

Machine Translation of Swiss CH710624B1 Security Method and verifiability of electronic voting, obtained at https://patents.google.com/patent/CH710624B1/en?oq=ch710624 on Oct. 17, 2019.*

Machine Translation of Chinese CN102722931 Voting system and voting method based on intelligent mobile communication devices, https://patents.google.com/patent/CN102722931B/en?oq=cn102722931 on Oct. 17, 2019.*

Stefano Bistarelli, et al, An End-to-end Voting system based on Bitcoin, Apr. 2017, Banca d'Italia. (Year: 2017).*

Notification of Transmittal of the International Search Report and the Written Opinion of the International Searching Authority (Forms PCT/ISA/220, PCT/ISA/210 and PCT/ISA/237) dated Mar. 14, 2019, by the European Patent Office in corresponding International Application No. PCT/US2018/063184. (12 pages).

* cited by examiner

METHOD AND SYSTEM FOR PUBLIC ELECTIONS ON A MODERATED BLOCKCHAIN

FIELD

The present disclosure relates to the processing of votes in a public blockchain, specifically the use of a moderated blockchain to provide for voting in public elections that maintains transparency regarding voting and vote count while retaining individual voting anonymity.

BACKGROUND

Public elections are a cornerstone of democratic governments throughout the world. Elections are held regularly in a vast number of jurisdictions and can result in anywhere from hundreds to tens of millions of votes, all of which must be made, verified, and counted, often in a span of hours on a single day. Traditionally votes were made via paper ballots, which then had to be counted by hand, requiring a significant number of individuals. Eventually, mechanical machines were made to assist in the counting of paper ballots. However, these still had to be operated by an individual and the results tabulated by authorized personnel, and were subject to malfunction and confusion in the operating of the machinery and marking of ballots.

Some jurisdictions have attempted to use computing systems to provide for electronic voting, which can automatically tabulate votes as they are received and provide for timely results without the need for as significant a number of personnel. However, such systems require separate computing devices to be installed at every polling location, which may be costly, and have also been repeatedly found to be insecure and vulnerable to hacking and other manipulation. As a result, many jurisdictions have continued to user paper ballots due to their reliability and security, despite the significant time and resource costs involved.

A few jurisdictions have utilized a blockchain for the posting of votes for an election. Such methods have involved using a blockchain that is designed for the transfer of digital currency in its traditional manner, where a voter places a "coin" (unit of digital currency) in the "box" (blockchain address) of the candidate they wish to vote for. This provides for the ability for a voter to ensure that their vote was properly cast and enables any individual or entity to count the votes to confirm the result of the election. However, traditional blockchains are consistently updated and, to remain trustworthy, are publicly available throughout the process, which means that votes can be counted as they are made. In addition, each voter must be separately registered and provided a unit of currency, requiring significant processing prior to the election being held and risking the revealing of identities of voters during the provisioning process. Thus, traditional blockchains may provide for security as to vote tampering, but cannot maintain the voter anonymity and protection of overall results provided by traditional voting methods.

Thus, there is a need for a technological solution to improve voting in public elections utilizing a blockchain that can provide for complete anonymity of voters and inability to tabulate votes until the polls have closed, while maintaining the ability to validate individual votes and overall results and the security provided by blockchain to prevent election tampering.

SUMMARY

The present disclosure provides a description of systems and methods for processing votes in a public blockchain. A public blockchain is used to ensure that an election can be audited and votes tabulated correctly without any possibility of vote tampering taking place, and where a vote can identify their individual vote to ensure it was counted for the proper candidate. The nodes in the blockchain utilize encryption on top of traditional blockchain mechanisms to ensure that votes cannot be counted early, while still being posted to the blockchain to provide for transparency through the process and later validation. In addition, the use of cryptographically unique references by voters without the need to transfer any currency to make votes can provide for complete anonymity of voters while still enabling voters to be cleared as authorized voters and able to track their individual vote throughout the process. The methods and systems discussed herein thus can provide for all of the benefits of using a blockchain in voting, but without any of the negatives of the use of a traditional blockchain via the specialized configuration discussed herein that utilizes additional cryptographic key pairs and cryptographically unique reference values.

A method for processing votes in a public blockchain includes: generating, by a generation module of a processing server, an election reference and two or more candidate references; generating, by an encryption module of the processing server, an asymmetric cryptographic key pair comprised of a master private key and a master public key; generating, by the generation module of the processing server, at least one registration block for addition to a blockchain, wherein each of the at least one registration block is comprised of a block header and one or more data values, wherein the one or more data values in the at least one registration block includes the election reference, the two or more candidate references, and the master public key; electronically transmitting, by a transmitting device of the processing server, each generated registration block to one or more nodes associated with the blockchain; receiving, by a receiving device of the processing server, a plurality of voting messages, wherein each voting message includes at least a vote and the election reference, where the vote includes at least a voter reference and one of the one or more candidate references; generating, by the generation module of the processing server, at least one voting block for addition to the blockchain, wherein each of the at least one voting block is comprised of a block header and one or more data values, wherein the one or more data values in the at least one voting block includes each of the received votes; and electronically transmitting, by the transmitting device of the processing server, each generated voting block to one or more nodes associated with the blockchain.

A system for processing votes in a public blockchain includes: a receiving device and a transmitting device of a processing server; a generation module of the processing server configured to generate an election reference and two or more candidate references; and an encryption module of the processing server configured to encrypt an asymmetric cryptographic key pair comprised of a master private key and a master public key, wherein the generation module of the processing server is further configured to generate at least one registration block for addition to a blockchain, wherein each of the at least one registration block is comprised of a block header and one or more data values, wherein the one or more data values in the at least one registration block includes the election reference, the two or more candidate references, and the master public key, the transmitting device of the processing server is configured to electronically transmit each generated registration block to one or more nodes associated with the blockchain, the receiving device of the processing server is configured to receive a plurality of voting messages, wherein each voting message includes at least a vote and the election reference, where the vote includes at least a voter reference and one of the one or more candidate references, the generation module of the processing server is further configured to generate at least one voting block for addition to the blockchain, wherein each of the at least one voting block is comprised of a block header and one or more data values, wherein the one or more data values in the at least one voting block includes each of the received votes and the transmitting device of the processing server is further configured to electronically transmit each generated voting block to one or more nodes associated with the blockchain.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms

Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Public Elections on a Moderated Blockchain

Figure 1:
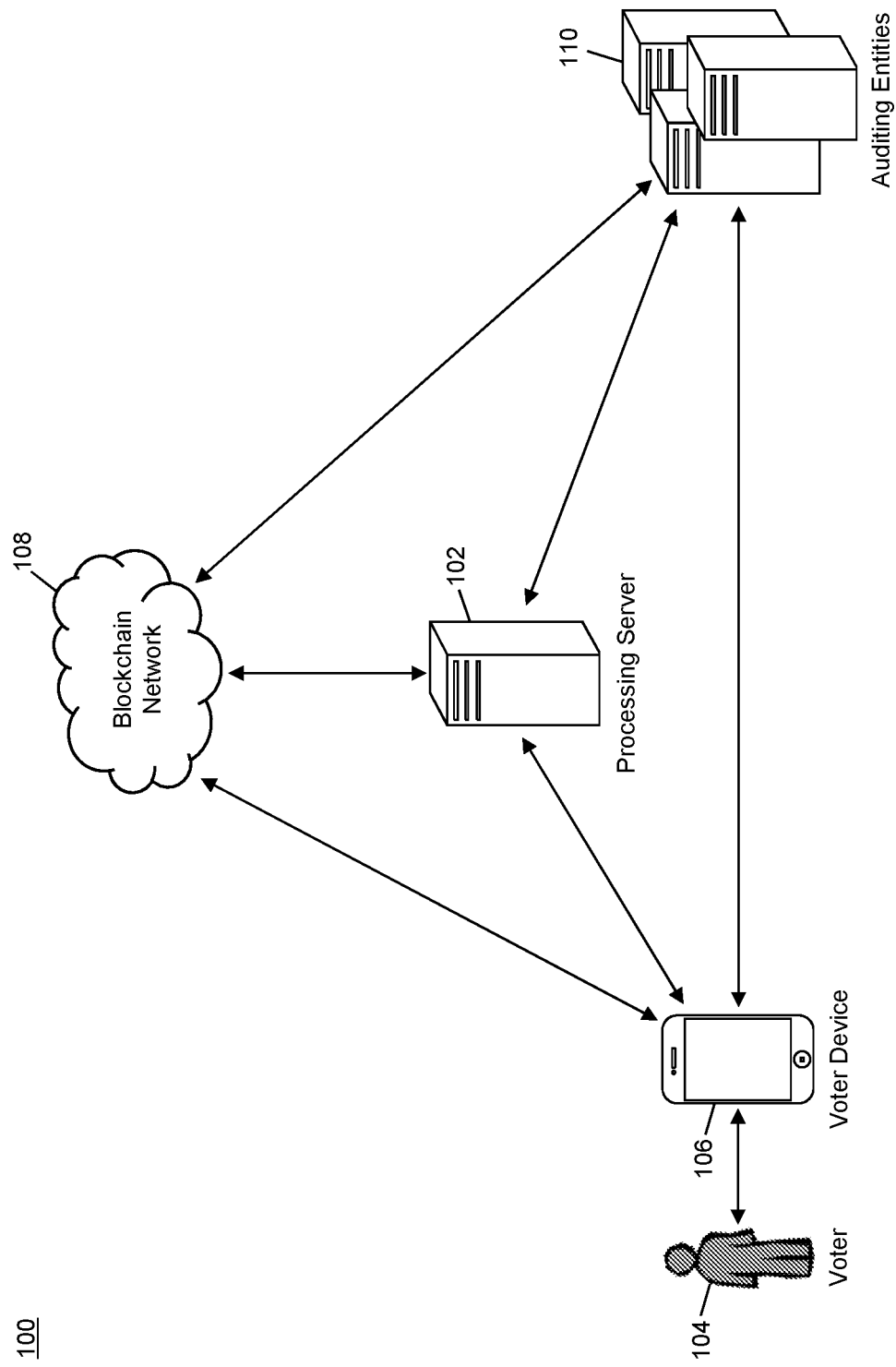
FIG. 1 is a block diagram illustrating a high level system architecture for processing votes for a public election using a moderated blockchain in accordance with exemplary embodiments.

FIG. 1 illustrates a system 100 for public elections conducted using a moderated blockchain and the processing of votes thereon utilizing multiple cryptographic key pairs and cryptographically unique reference values.

The system 100 may include a processing server 102. The processing server 102, discussed in more detail below, may be one of a plurality of specifically configured computing systems that is configured to operate as a moderator of a blockchain used for public elections, which may be configured to digitally sign all blocks added to the blockchain, including blocks used for registration of candidates, casting and tabulating of votes, etc. The system 100 may include a blockchain network 108. The blockchain network 108 may be comprised of a plurality of nodes, which may each be configured to generate and validate blocks using a suitable validation mechanism, such as proof of work, for the addition of blocks to the blockchain. In the system 100, the processing server 102 may be configured to digitally sign blocks that are generated and validated by nodes prior to addition to the blockchain. In some embodiments, the processing server 102 may be a node. In other embodiments, the blockchain network 108 may be comprised entirely of processing servers 102 as nodes. In other words, each node in the blockchain network 108 may be configured to digitally sign blocks prior to addition in the blockchain.

Prior to the start of an election, the processing server 102 may first generate values for use in the election. In some embodiments, the processing server 102 or a node in the blockchain network 108 may create a new blockchain for use in the election. In other embodiments, an existing blockchain may be used, where all entries added to the blockchain related to the new election may include a specific reference value associated with the election. Such a reference value may be referred to herein as an election reference. In some cases, the election reference may be a hash value generated by the processing server 102 that may be cryptographically unique from the reference value for any other election, such as to ensure there is no collision for votes and other entries related to a given election. In some such cases, the election reference may be generated via the hashing of a specific set of data associated with the election, such as of references to the candidates in the election, discussed in more detail below. In some instances, the election reference may still be used in cases where a new blockchain is used, such as to accommodate additional elections or to otherwise ensure accuracy in voting and other functions performed via the moderated blockchain.

Reference values for each of the candidates that may be voted on in the election may also be generated prior to the election. In some embodiments, the reference values for candidates may be hash values that are cryptographically unique to prevent collision with other candidates in the same or other elections. In some instances, the candidate references may be of a significant size (e.g., 64) to prevent collision and to also prevent voting mistakes (e.g., to avoid the accidental voting of one candidate instead of another due in a given election to a typo of a single digit)

Once the election reference and candidate references have been generated, a first block for the election may be generated (e.g., by the processing server 102 or a node in the blockchain network 108, as applicable) and added to the blockchain using suitable block generation and validation mechanisms. In cases where a new blockchain is being used, the block may be what is known to persons having skill in the relevant art as a genesis block. A genesis block may be comprised of a block header, the election reference, and the candidate references. In some instances, candidate references may be accompanied by names or other data identifying the candidates associated with each reference. In some cases, the data values in the block may also include an address of the processing server 102, such as for use by other systems in communicating with the processing server 102. The block header may include at least a timestamp and a reference to the data accompanying the block header in the block, referred to herein as a data reference value. In an exemplary embodiment, the data reference value may be a hash value generated via application of one or more hashing algorithms to the accompanying data, such as the election reference and master public key for the genesis block. In some cases, the data reference value may be the root of a Merkle tree of the accompanying data.

If the block is not a genesis block, and for all subsequent blocks in the blockchain, a block header may also include a block reference value, which may be a reference to the previous block (e.g., determined by timestamp) added to the blockchain, such as a hash value of the block header of the previous block. It is noted that the block reference value may refer to the prior block in the blockchain even if related to a different election. In cases where the blockchain is used for multiple elections, each block may include an election reference for the election as one of the data values in a block or in the block's block header. The use of data reference values and block reference values may ensure immutability of the blockchain as the modification of a single data value on the blockchain (e.g., of a vote or candidate reference) would require modification to that block's data reference value, and then to the block reference value of the subsequently added block, and then to the block reference value in the next added block, and so on through the entire blockchain, which must be performed at every single node in the blockchain prior to the addition of a new block, which may be impossible due to limitations on processing and network communications.

Once the first block for the election has been added to the blockchain, voters 104 may be registered for voting. Each voter 104 may possess or otherwise have access to a voter device 106 that the voter 104 will use to cast his or her vote for the election. The voter device 106 may be any computing device specifically configured to perform the functions discussed herein, such as a specifically configured desktop computer, laptop computer, notebook computer, tablet computer, cellular phone, smart phone, smart watch, smart television, wearable computing device, implantable computing device, etc. The voter 104 may, using the voter device 106, generate a voting key pair, which may be a cryptographic key pair comprised of a voting private key and a voting public key. A voting address for the voter 104 may be generated using the voting public key associated with that voter 104, either by the voter device 106 or another system, such as the processing server 102 or an auditing entity 110. Auditing entities 110 may be additional computing systems that are used to perform additional functions in the system 100 to assist in the elections. The voter's voting address may be submitted to the processing server 102 for addition to the blockchain. In some embodiments, the voting address may be generated using Base58check encoding.

In an exemplary embodiment, the identity of the voter 104 and the entitlement of the voter 104 to vote may be verified prior to the registration of the voter's voting address on the blockchain. In such embodiments, an auditing entity 110 may be provided with information by the voter 104 (e.g., via the voting device 108) to verify the voter's identity and entitlement to vote. For instance, an auditing entity 110 may be a governmental agency that may verify that the voter 104 is a registered voter in the jurisdiction of the election and is who they are purporting to be using suitable identity-verification mechanisms. The auditing entity 110 may inform the processing server 102 of the voter's successful verification using any suitable communication network and method.

Once the voter's entitlement to vote has been verified, their registration may be added to the blockchain. A new block may be generated that includes a data value for the voter's registration, which may include at least the election reference and the voter's voting address. In some embodiments, a voter registration may also include additional data that may be suitable for use in an election, such as voting credentials that may be required by an auditing entity 110, a delegate signature, etc. The processing server 102 (e.g., or nodes in the blockchain network 108, as applicable) may continue to receive voter registrations, which may be added to the blockchain accordingly. In some cases, new blocks may be added at predetermined intervals of time (e.g., every ten minutes). In other cases, new blocks may be added as registrations are received. In some embodiments, new voter registrations may be continued to be received by the processing server 102 any time prior to an election, but may only be accepted up until a predetermined prior to the start of the election.

As new blocks are added to the blockchain with voter registrations, each voter 104 may be able to verify that they are registered to vote by viewing the blockchain. As the blockchain is publicly available, a voter 104 may view the blocks and the data values included therein and identify their voting address with the election reference for the election. This may indicate to the voter 104 that they have successfully registered to vote in that election. By utilizing addresses generated by the voter 104 themselves using their own device, registration may be performed more quickly than in traditional voting systems by eliminating the need for a centralized system to generate addresses or other identifiers for every single voter 104 and distribute them. In addition, by allowing voters 104 to use their own voting devices 106, elections can be performed without the need for computing systems distributed at polling locations throughout the jurisdiction. In fact, as discussed in more detail below, the system 100 may eliminate the need for polling locations entirely using the methods and systems discussed herein.

When voting is scheduled to begin, the processing server 102 may generate an election master key pair. The election master key pair may be a cryptographic key pair generated by the processing server 102 using a suitable key generation mechanism that is comprised of a master private key and a corresponding master public key. In some embodiments, the master key pair may utilize a suitable key generation algorithm such that messages encrypted using the master public key may be decrypted via the master private key without knowledge of the master public key used for the encryption. A new data value may be generated for addition to the blockchain at or prior to the start of voting that includes at least the election reference and the master public key, for use by voters 104 to vote in the election. In an exemplary embodiment, the processing server 102 may digitally sign the data value prior to its addition to the blockchain. In some cases, the processing server 102 may use the master private key to generate digital signatures as part of the moderation of the election by the processing server 102. In other cases, the processing server 102 may generate an additional cryptographic key pair comprised of a validation private key and a validation public key, referred to herein as a validation key pair. In such cases, the processing server 102 may sign all data values it contributes to the blockchain for the election using the validation private key. The validation public key may be included with the master public key, which may then be used by voters 104 and auditing entities 110 to verify the digital signatures of the data values added to the blockchain to verify that they were made by authorized moderators (e.g., processing servers 102).

In some embodiments, the processing server 102 may be configured to delete the master private key once the master public key has been posted to the blockchain. In such embodiments, this may be done to ensure that votes cannot be decrypted prior to the closing of the election. In these embodiments, the processing server 102 may be configured to generate one or more components from the master private key that may be used to rebuild the key at a later time. In some cases, the processing server 102 may distribute separate key components to separate auditing entities 110 to prevent the ability for any entity or system to recreate the master private key until voting has ended. In these cases, each auditing entity 110 may have its own associated cryptographic key pair, referred to herein as an auditing key pair, comprised of an auditing private key and an auditing public key, and the processing server 102 may encrypt the key component that is being distributed to each auditing entity 110 with its auditing public key and may post pairs of the auditing public key and corresponding encrypted key component to the blockchain along with the master public key. The auditing entities 110 may decrypt the key components using their auditing private keys, and may re-encrypt the key component using a public key associated with the processing server 102, such as the validation public key or a public key of another cryptographic key pair generated by the processing server 102. The re-encrypted key components may be returned to the processing server 102 after the election has closed (e.g., directly or via posts on the blockchain), where the processing server 102 may decrypt the key components and recreate the master private key. Additional information regarding the breaking of a private key into components, distribution thereof, and use in recreating the private key can be found in U.S. patent application Ser. No. 15/001,775, entitled "Method and System for Distributed Cryptographic Key Provisioning and Storage via Elliptic Curve Cryptography" by Steven C. Davis, filed on Jan. 1, 2016, which is herein incorporated by reference in its entirety.

After voting is opened and the master public key has been posted to the blockchain, voters 104 may begin placing their votes. The voter 104 may place their vote by submitting a new data value for inclusion on the blockchain that has their vote. The voter 104 may, using their voting device 104, select a candidate using their candidate reference that had been previously posted to the blockchain. The voter 104 may also generate their own reference value for their vote, referred to herein as a voter reference, for inclusion with their vote. The voter reference may be any value that may be used by the voter 104 to identify their vote to ensure that their vote was made and counted for the correct candidate. In some cases, the voter 104 may manually select a voter reference. In other cases, the voter device 106 may be configured to generate a voter reference that may be cryptographically unique from other voter references to ensure collision. In one example, the voter device 106 may generate a cryptographic key pair, use the public key to generate the voter reference, and may then discard the keys. Once the voter reference has been generated and candidate(s) selected, the voter device 106 may encrypt the data using the master public key. In some instances, a nonce may be included in the data prior to encryption as a further security measure. The voter device 106 may then submit the encrypted vote along with the election reference to which it pertains to the processing server 102, an auditing entity 110, or a node in the blockchain network 108. The encrypted vote and election reference may then be posted as a data value in a new block added to the blockchain. The voter 104 can ensure that their vote was received by identifying the encrypted vote on the blockchain.

In some embodiments, once a voter 104 has placed their vote, they may submit a verification to verify that they have voted, as the encrypted vote posted to the blockchain cannot be attributed to them. In such embodiments, once the voter 104 verifies that their encrypted vote was received and added to the blockchain, the voter 104 may issue a verification message to the processing server 102 that includes the election reference, their voting public key, the block reference value included in the most recent block added to the blockchain, and a digital signature of the block reference value generated using their voting private key. The processing server 102 can then validate the digital signature using the voting public key and post the verification message to the blockchain. By using the block reference value, it can ensure that the time at which the voter 104 verifies their voting is registered and immutable. In addition, by using the block reference value for the most recent block, rather than any data associated with their encrypted vote or necessarily the block reference value for the block that includes their encrypted vote, it prevents any entity form being able to identify what encrypted vote is associated with the voter 104. In other words, the blockchain will then include various encrypted votes along with various verifications from voters 104 that they have voted, but without any ability to match verified voters to their votes.

Once voting has concluded, the processing server 102 may decrypt the votes. In cases where the master private key was deleted, the processing server 102 may recreate the master private key using the methods discussed herein. The processing server 102 may identify all of the encrypted votes posted to the blockchain and may, in exemplary embodiments, randomly shuffle the list of encrypted votes, to further prohibit the ability to match a vote to a voter 104.

The processing server 102 may decrypt each of the encrypted votes using the master private key. The processing server 102 may then post the decrypted votes to the blockchain along with the election reference, as well as including the validation public key and a digital signature generated over the decrypted votes using the validation private key, as applicable.

Once the decrypted votes have been posted to the blockchain, the votes may be counted by any interested party. Any entity interested in the results of the election may validate the digital signature posted with the decrypted votes using the included public key, and may be able to tabulate the votes for each candidate by identifying the respective candidate reference included in each of the decrypted votes. Each voter 104 may also be able to verify that their vote was counted and for the correct candidate by utilizing their voter reference. The voter 104 may identify a decrypted vote that includes their voter reference and identify the candidate reference included therewith, to ensure that their vote was made accurately and not tampered with. In some embodiments, the processing server 102 may tabulate the votes for each candidate reference and may make a final post to the blockchain for the election that includes the election reference and the results (e.g., the number of votes for each candidate reference). The processing server 102 may then delete the master key pair and validation key pair for that election.

As discussed herein, the processing server 102 may be able to perform moderation of the voting on the public blockchain for multiple elections, including for multiple elections being conducted at the same time, via the use of election references. The election references may enable all votes to be properly counted for the correct elections even if a vast number of elections are utilizing the same blockchain and being moderated by the same processing server or servers 102. In addition, the use of cryptographically unique candidate references may further prevent the miscounting of votes for improper candidates or candidates in other elections, while cryptographically unique voter references may enable voters 104 to easily find their votes in any election among the blockchain.

The methods and systems discussed herein thus provide for voting with a public blockchain that is a significant technological improvement over traditional paper and electronic voting, as well as significant improvements over prior attempts at using a blockchain in public elections. The use of a master key pair to encrypt votes and the manner in which it is utilized as discussed herein prevents any entity from being able to decrypt votes and tabulate results while the election is being held. The use of voter references and the method discussed herein for voter verification can also prevent any entity from matching a voter 104 to a vote, thereby completely protecting voter 104 anonymity. The methods and systems discussed herein can also be implemented using a minimal number of processing servers 102, thus reducing the costs and processing power associated with holding a public election via an electronic method. Furthermore, the methods discussed herein allow for voters 104 to cast votes using personal voter devices 106 while maintaining complete security of the voting process, negating the need for polling places and the cost of deploying terminals and personnel thereto. As a result, the methods and systems discussed herein can accomplish every benefit of traditional voting methods while simultaneously providing significant increases in speed and efficiency, decreases in cost and resource expenditure, and without any negative effects.

Processing Server

Figure 2:
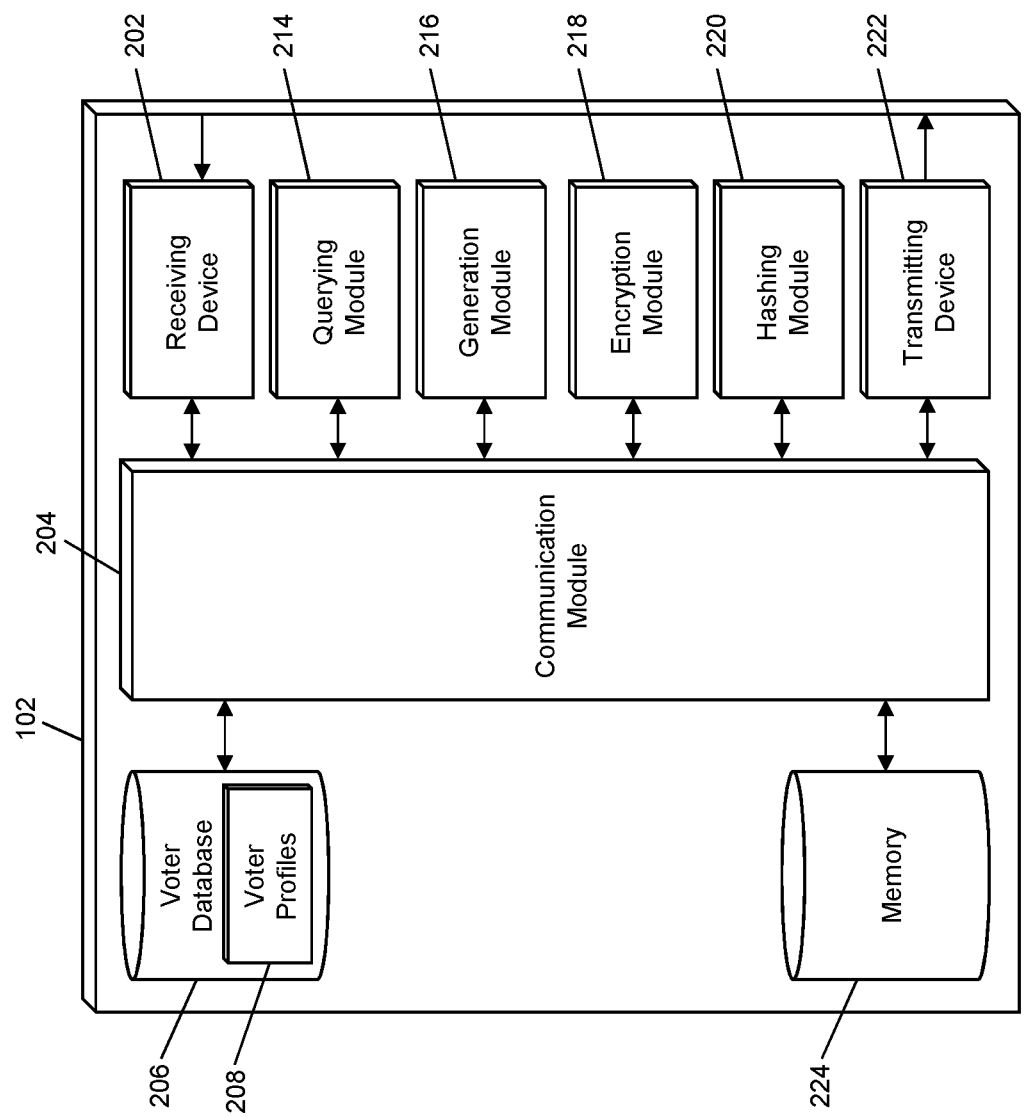
FIG. 2 is a block diagram illustrating the processing server of the system of FIG. 1 for the processing of votes for a moderated blockchain in accordance with exemplary embodiments.

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 600 illustrated in FIG. 6 and discussed in more detail below may be a suitable configuration of the processing server 102.

The processing server 102 may include a receiving device 202. The receiving device 202 may be configured to receive data over one or more networks via one or more network protocols. In some instances, the receiving device 202 may be configured to receive data from nodes in blockchain networks 108, voter devices 106, auditing entities 110, other processing servers 102, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by voter devices 106 that are superimposed or otherwise encoded with registration messages, encrypted votes, or verification messages. The receiving device 202 may also receive data signals electronically transmitted by auditing entities 110, which may be superimposed or otherwise encoded with confirmation of voter entitlements or messages originating from voter devices 106 that are verified and forwarded via the auditing entities 110 or encrypted key components or messages associated therewith. The receiving device 202 may also be configured to receive data signals from nodes in the blockchain network 108 and/or other processing servers 102 that are superimposed or otherwise encoded with new blocks for validation, validated blocks, or data to be included in newly generated blocks.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, encryption module 218, hashing module 220, etc. As used herein, the term "module" may be software or hardware particularly programmed to receive an input, perform one or more processes using the input, and provides an output. The input, output, and processes performed by various modules will be apparent to one skilled in the art based upon the present disclosure.

In some embodiments, the processing server 102 may include a voter database 206. The voter database 206 may be configured to store a plurality of voter profiles 208 using a suitable data storage format and schema. The voter database 206 may be a relational database that utilizes structured query language for the storage, identification, modifying, updating, accessing, etc. of structured data sets stored therein. Each voter profile 208 may be a structured data set configured to store data related to a voter 104. The voter profile 208 may include, for instance, voter identification data that may be used to verify a voter's identity and entitlement to vote in one or more elections, for use in the voter registration process as discussed herein. In some cases, a voter profile 208 may be configured to store data associated with voter registration in one or more elections, such as a supplied voter address and voting public key.

The processing server 102 may include a querying module 214. The querying module 214 may be configured to execute queries on databases to identify information. The querying module 214 may receive one or more data values or query strings, and may execute a query string based thereon on an indicated database, such as the voter database 206, to identify information stored therein. The querying module 214 may then output the identified information to an appropriate engine or module of the processing server 102 as necessary. The querying module 214 may, for example, execute a query on the voter database 208 to identify a voter profile 206 related to a received voter registration message for use in verifying a voter's identity and entitlement. The querying module 214 may also execute queries on blockchain data to identify data values included therein, such as to identify encrypted votes for decrypting and tabulating of votes or to identify encrypted key components for use in reconstituting the master private key.

The processing server 102 may also include a generation module 216. The generation module 216 may be configured to generate data for use by the processing server 102 in performing the functions discussed herein. The generation module 216 may receive instructions as input, may generate data as instructed, and may output the generated data to another module or engine of the processing server 102. For example, the generation module 216 may be configured to generate block headers and new blocks for validation and storage in the blockchain. The generation module 216 may also be configured to generate key components of the master private key for provisioning to the auditing entities 110 prior to an election and to generate the master private key using the key components.

The processing server 102 may also include an encryption module 218. The encryption module 218 may be configured to encrypt data and generate cryptographic key pairs for use by the processing server 102 in performing the functions discussed herein. The encryption module 218 may receive instructions as input, which may be accompanied with data (e.g., for encryption or decryption), may generate keys, encrypt data, or decrypt data as instructed, and may output the result to another module or engine of the processing server 102. For example, the encryption module 218 may be configured to generate asymmetric cryptographic key pairs, such as the master key pair, and symmetric cryptographic key pairs, such as the validation key pair. The encryption module 218 may also be configured to encrypted data using public keys and decrypt data using private keys, such as the decryption of encrypted votes using the master private key as discussed herein.

The processing server 102 may also include a hashing module 220. The hashing module 220 may be configured to generate hash values via hashing for the processing server 102 for performing the functions discussed herein. The hashing module 220 may receive data to be hashed, may apply one or more hashing algorithms to the data to generate a hash value, and may output the generated hash value to another module or engine of the processing server 102. For example, the hashing module 220 may be configured to generate an election reference and candidate references for use in public elections as discussed herein.

The processing server 102 may also include a transmitting device 222. The transmitting device 222 may be configured to transmit data over one or more networks via one or more network protocols. In some instances, the transmitting device 222 may be configured to transmit data to other processing servers 102, nodes in the blockchain network 104, voter devices 106, auditing entities 110, and other entities via one or more communication methods, local area networks, wireless area networks, cellular communication, Bluetooth, radio frequency, the Internet, etc. In some embodiments, the transmitting device 222 may be comprised of multiple devices, such as different transmitting devices for transmitting data over different networks, such as a first transmitting device for transmitting data over a local area network and a second transmitting device for transmitting data via the Internet. The transmitting device 222 may electronically transmit data signals that have data superimposed that may be parsed by a receiving computing device. In some instances, the transmitting device 222 may include one or more modules for superimposing, encoding, or otherwise formatting data into data signals suitable for transmission.

The transmitting device 222 may be configured to electronically transmit data signals superimposed or otherwise encoded with data values for inclusion in newly generated blocks or newly generated blocks to nodes in the blockchain network 108 for posting to the blockchain. The transmitting device 222 may also be configured to electronically transmit data signals superimposed or otherwise encoded with confirmation messages and other data exchanges to voter devices 106 and auditing entities 110 for performing any additional functions discussed herein, such as for seeking verification of a voter identity or entitlement from an auditing entity 110.

The processing server 102 may also include a memory 224. The memory 224 may be configured to store data for use by the processing server 102 in performing the functions discussed herein, such as public and private keys, symmetric keys, etc. The memory 224 may be configured to store data using suitable data formatting methods and schema and may be any suitable type of memory, such as read-only memory, random access memory, etc. The memory 224 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 224 may be comprised of or may otherwise include a relational database that utilizes structured query language for the storage, identification, modifying, updating, accessing, etc. of structured data sets stored therein. The memory 224 may be configured to store, for example, the blockchain associated with the blockchain network 108 or other data associated therewith, such as auditing public keys, voter addresses, voting public keys, election references, candidate references, voting registration period times, voting period times, etc.

Process for Election and Voter Registration

Figure 3:
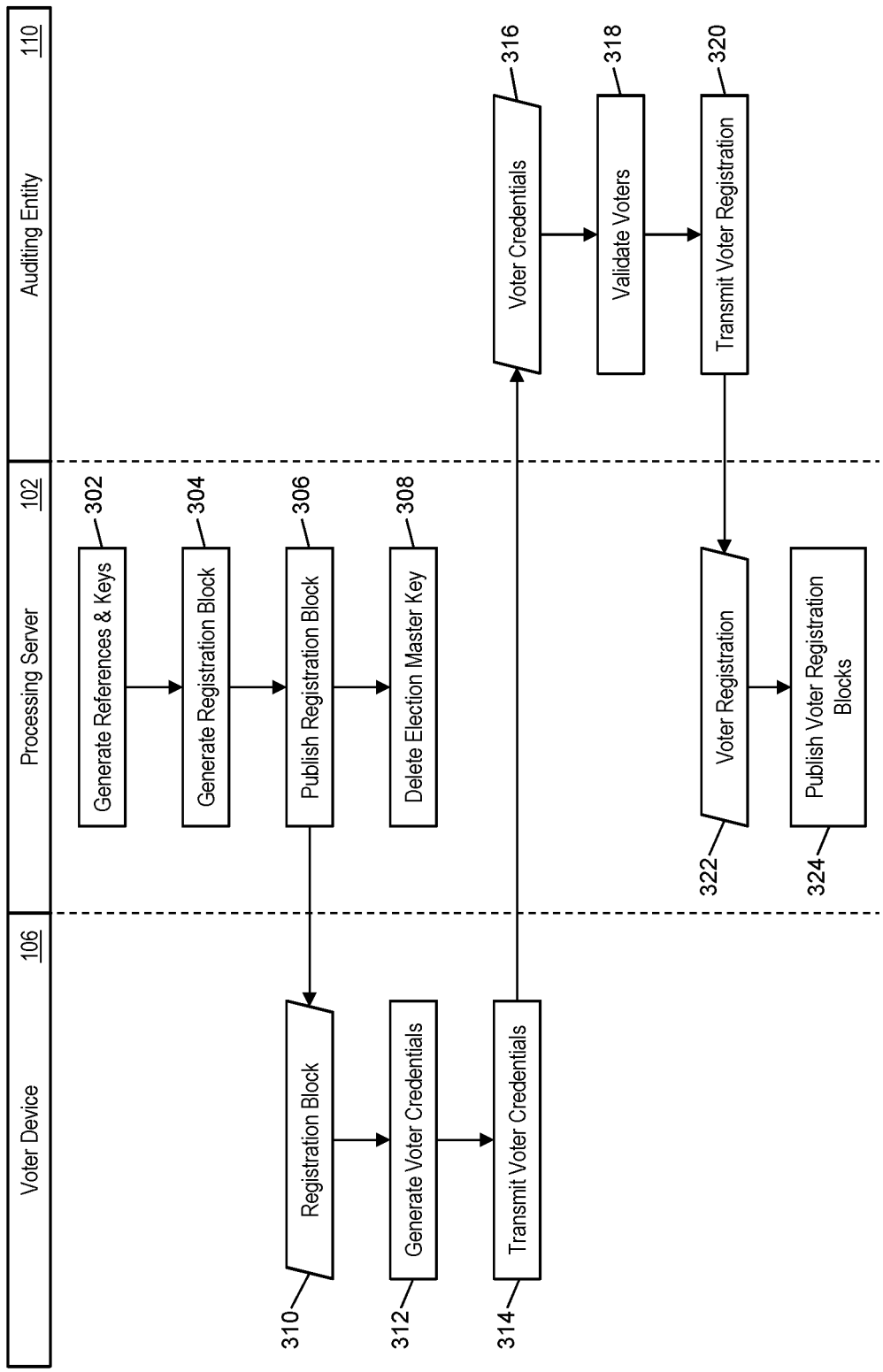
FIG. 3 is a flow diagram illustrating a process for configuring a public election using a moderated blockchain and registration of voters in the system of FIG. 1 in accordance with exemplary embodiments.

FIG. 3 illustrates a process for the registration of a new election and registration of voters eligible for voting in the election in the system 100 using a moderated blockchain.

In step 302, the processing server 102 may generate the reference values and keys necessary for the registration of a new public election to be held. This may include the generation of an election reference for the election by the hashing module 220 of the processing server 102, the generation of a candidate reference for every candidate running in the election by the hashing module 220, the generation of the master key pair by the encryption module 218 of the processing server, and the generation of the validation key pair by the encryption module 218. In embodiments where the master private key is deleted during the election, step 302 may also include the generation of a plurality of key components by the generation module 216 of the processing server, which may be encrypted, by the encryption module 218, using auditing public keys associated with auditing entities 110. In step 304, the generation module 216 of the processing server 102 may generate a registration block, which may include at least the master public key, validation public key, election reference, a digital signature generated over the keys and reference using the validation public key, and pairs consisting of the encrypted key components and their corresponding auditing public keys. In step 306, the registration block may be validated and posted to the blockchain. In step 308, the querying module 214 of the processing server 102 may execute a query on the memory 224 of the processing server 102 to delete the master private key.

In step 310, the voter 104 may, using the voter device 106, download the registration block for the election that they wish to register to vote in. In step 312, the voter device 106 may generate voter credentials. The voter credentials may include at least a voting key pair comprised of a voting public key and voting private key, a voter address generated using the voting public key, and any identifying information needed for use in verifying the identity of the voter 104 or entitlement for the election. In step 314, the voter device 106 may electronically transmit the voter credentials to the auditing entity 110 using a suitable communication network and method. In step 316, the auditing entity 110 may receive the voting credentials from the voting device 106, which may also include the election reference for the election in which the voter wants to register.

In step 318, the auditing entity 110 may verify the voter's identity and their entitlement to vote in the election associated with the election reference using suitable methods. If the voter 104 is verified, then, in step 320, the auditing entity 110 may forward the voter registration data to the processing server 102. In step 322, the receiving device 202 of the processing server 102 may receive the voter registration data, which may include at least the election reference, voting address, and any voter credentials that may also be included in the blockchain for use in auditing of voter registration. In step 324, the generation module 216 may generate a new block that includes the voter registration data as a data value included therein, which may be validated and posted to the blockchain.

Process for Voting in a Public Election Via a Moderated Blockchain

Figure 4:
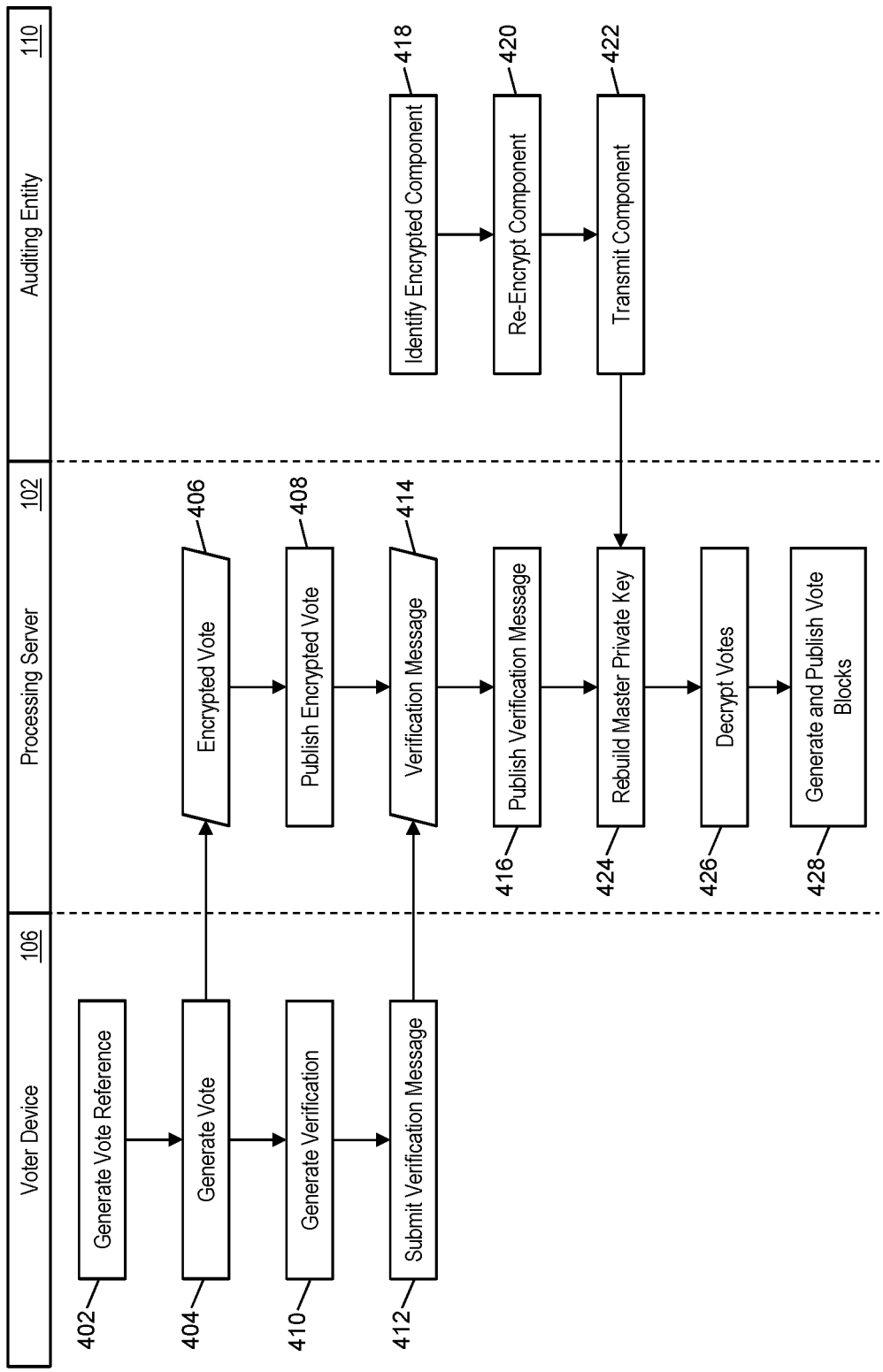
FIG. 4 is a flow diagram illustrating a process for the processing of votes in a public election on a moderated blockchain in the system of FIG. 1 in accordance with exemplary embodiments.

FIG. 4 illustrates a process for the casting, processing, and counting of votes in a public election using the moderated blockchain of the system 100 discussed above.

In step 402, a voter 104 may use their voter device 106 to generate a voter reference, which may be used by the voter 104 to track their vote and ensure it is counted for the appropriate candidate in the correct election. In some instances, the voter 104 may manually select their voter reference. In other instances, the voter device 106 may generate a cryptographic key pair and use the public key thereof to generate the voter reference, which may be of a significant size (e.g., 64 bytes) to reduce the likelihood of collision with other voter references. In step 404, the voter 104 may select a candidate in an election and the voter device 106 may generate their vote. The vote may be generated by encrypting a combined message of the voter reference and the candidate reference of their selected candidate using the master public key posted in the blockchain for the election. In some cases, a random nonce may also be included in the message prior to encryption. The voter device 106 may electronically transmit the encrypted vote and the election reference for the election reference to the processing server 102.

In step 406, the receiving device 202 of the processing server 102 may receive the encrypted vote and election reference. In step 408, the generation module 216 of the processing server 102 may generate a new block that includes any received encrypted votes and their election references as data values therein and may electronically transmit, via the transmitting device 222 thereof, the generated block to nodes in the blockchain network 108 for validation and posting to the blockchain. Once the voter 104 has cast their vote, the voter device 106 may, at step 410, generate a verification message for use in verifying that they voter 104 has voted. In some cases, the voter device 106 may wait until the encrypted vote has been identified in the published blockchain before generating and submitting the verification message. The verification message may include at least the election reference, the voting public key, the block reference value included in the latest block added to the blockchain, and a digital signature of the block reference value generated using the voting private key. In step 412, the voter device 106 may submit the verification message to the processing server 102. In step 414, the receiving device 202 of the processing server 102 may receive the verification message. In step 416, the generation module 216 of the processing server 102 may generate a new block that includes any received verification messages as data values therein and may electronically transmit, via the transmitting device 222 thereof, the generated block to nodes in the blockchain network 108 for validation and posting (e.g., publishing) to the blockchain.

During the election or once the election has concluded, auditing entities 110 may, at step 418, identify key components provisioned thereto (e.g., in the blockchain or received via separate communications from the processing server 102) that were encrypted using an auditing public key associated with the respective auditing entity 110. In step 420, the auditing entity 110 may decrypt the encrypted key component using their auditing private key and may then re-encrypt the key component using the validation public key associated with the processing server 102 and published during the registration of the election. In some embodiments, additional components may be used in the decryption and re-encryption of the key component, such as data for use in generating and using shared secrets. In step 422, the re-encrypted key component may be transmitted to the processing server 102, such as in a direct communication or via a inclusion in a data value that is included in a newly generated block that is posted to the blockchain.

In step 424, the receiving device 202 of the processing server 102 may receive the re-encrypted key components, the encryption module 218 of the processing server 102 may decrypt the re-encrypted key components using the validation private key, and, once the election has closed (e.g., no more votes are accepted), the generation module 216 of the processing server 102 may generate the master private key therefrom. In step 426, the processing server 102 may shuffle all of the encrypted votes received for any given election (e.g., identified by the election reference) and the encryption module 218 of the processing server 102 may decrypt all of the encrypted votes using the master private key for that election. In step 428, the generation module 216 of the processing server 102 may generate one or more vote blocks that include the decrypted votes as data values included therein, which may then be distributed to nodes in the blockchain network 108 and posted (e.g., published) to the blockchain. The votes may then be counted by any entity with the desire to do so, and each voter 104 may be able to verify that their vote was made and counted for the correct candidate using their voter reference. In some embodiments, the processing server 102 may tabulate the votes for each candidate and post an additional block that includes a data value containing results of the election.

Exemplary Method for Processing Votes in a Public Blockchain

Figure 5:
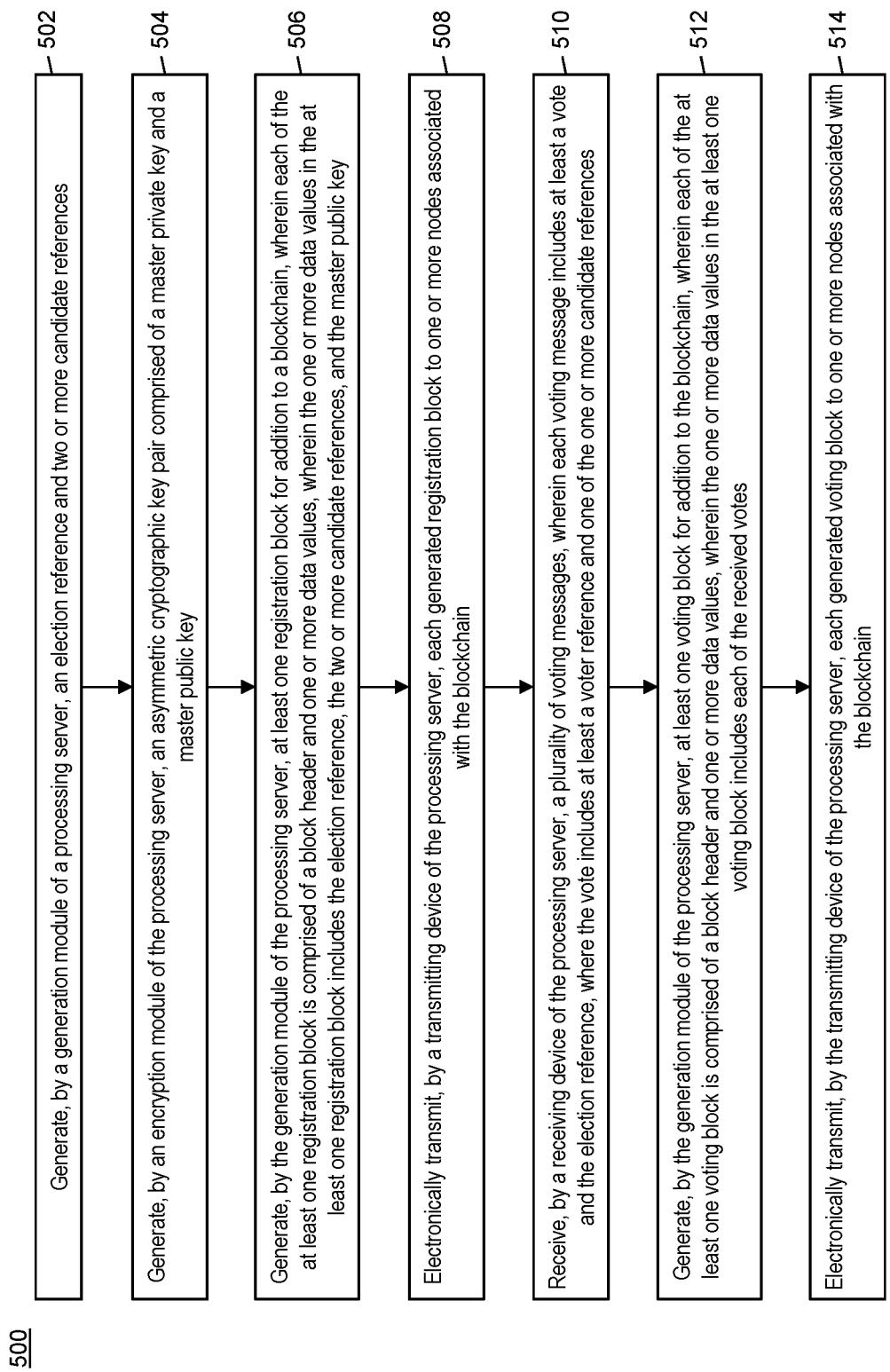
FIG. 5 is a flow chart illustrating an exemplary method for processing votes in a public blockchain in accordance with exemplary embodiments.

FIG. 5 illustrates a method 500 for the processing of votes for a public election using cryptographically unique reference values and cryptographic key pairs combined with a moderated blockchain.

In step 502, an election reference and two or more candidate references may be generated by a generation module (e.g., the generation module 216) of a processing server (e.g., the processing server 102). In step 504, an asymmetric cryptographic key pair comprised of a master private key and a master public key may be generated by an encryption module (e.g., the encryption module 218) of the processing server. In step 506, at least one registration block may be generated by the generation module of the processing server for addition to a blockchain, wherein each of the at least one registration block is comprised of a block header and one or more data values, wherein the one or more data values in the at least one registration block includes the election reference, the two or more candidate references, and the master public key.

In step 508, each generated registration block may be electronically transmitted by a transmitting device (e.g., the transmitting device 222) of the processing server to one or more nodes associated with the blockchain. In step 510, a plurality of voting messages may be received by a receiving device (e.g., the receiving device 202) of the processing server, wherein each voting message includes at least a vote and the election reference, where the vote includes at least a voter reference and one of the one or more candidate references. In step 512, at least one voting block may be generated by the generation module of the processing server for addition to the blockchain, wherein each of the at least one voting block is comprised of a block header and one or more data values, wherein the one or more data values in the at least one voting block includes each of the received votes. In step 514, each generated voting block may be electronically transmitted by the transmitting device of the processing server to one or more nodes associated with the blockchain.

In one embodiment, each received vote may be encrypted, receiving the plurality of voting messages may further include decrypting, by the encryption module of the processing server, each encrypted vote using the master private key, and the votes included in the one or more data values in the at least one voting block may be decrypted votes. In some embodiments, the method 500 may further include: generating, by the encryption module of the processing server, a symmetric cryptographic key pair comprised of a validation public key and a validation private key; and generating, by the encryption module of the processing server, a digital signature over the election reference, the two or more candidate references, and the master public key using the validation private key, wherein the generated digital signature and validation public key are further included in the one or more data values included in the one or more registration blocks. In a further embodiment, the method 500 may even further include generating, by the encryption module of the processing server, a voting digital signature for each of the votes over the vote using the validation private key, wherein the generated voting digital signature accompanies the respective vote in the one or more voting blocks.

In one embodiment, each vote may further include a voting nonce. In some embodiments, the election reference may be a hash value generated via application of a hashing algorithm. In one embodiment, each of the candidate references may be a blockchain address associated with the blockchain and generated using a corresponding public key. In some embodiments, the method 500 may also include generating, by the generation module of the processing server, a plurality of key components using the master private key; storing, in a memory (e.g., the memory 224) of the processing server, the plurality of key components; deleting, from the processing server, the master private key following storage of the plurality of key components and prior to electronic transmission of the one or more registration blocks; and generating, by the encryption module of the processing server, the master private key using the plurality of key components stored in the memory following receipt of the plurality of voting messages. In one embodiment, each of the voter references may be a cryptographically unique value. In a further embodiment, each of the voter references may be generated using a voter public key of a symmetric cryptographic key pair.

Computer System Architecture

Figure 6:
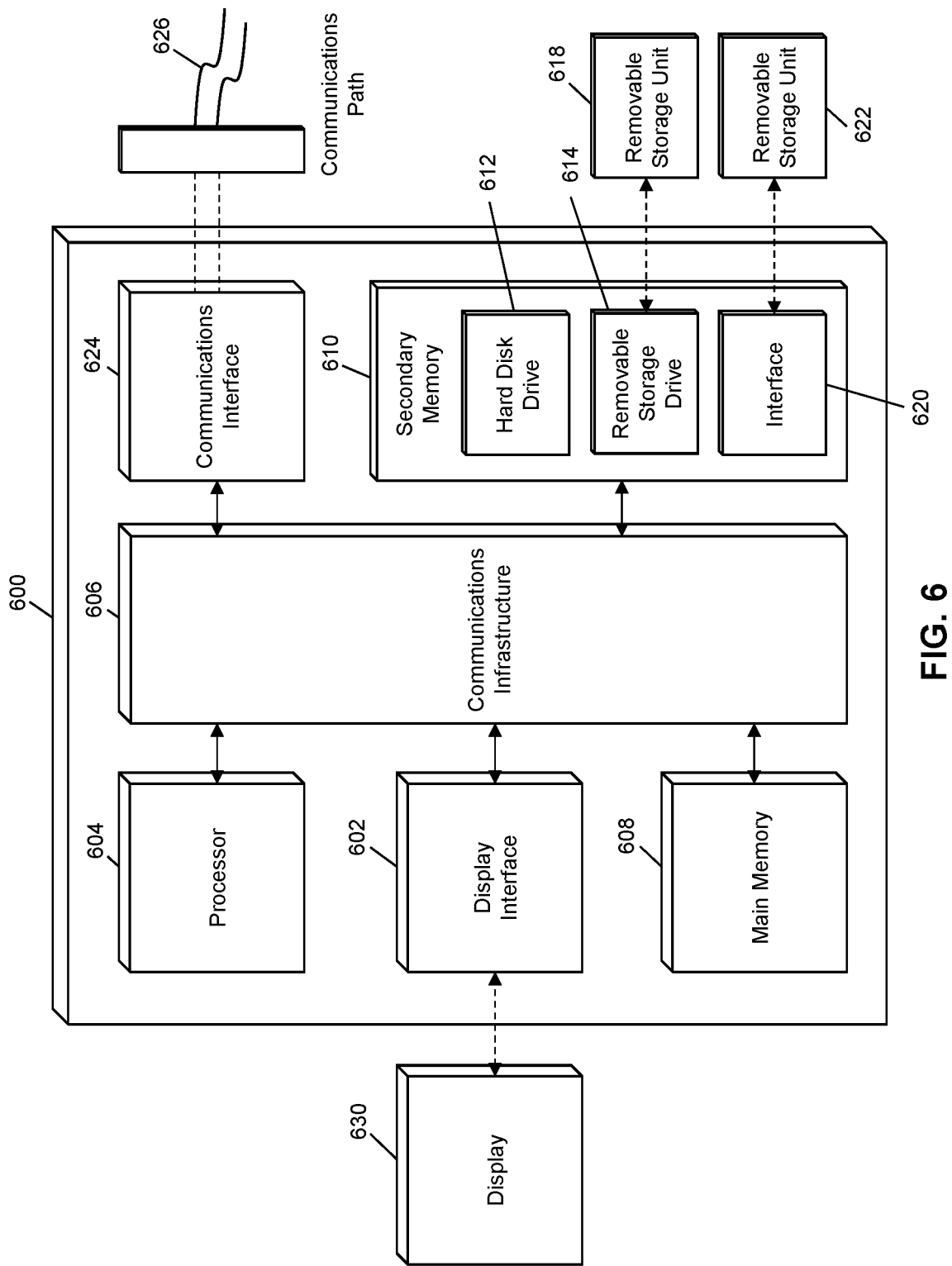
FIG. 6 is a block diagram illustrating a computer system architecture in accordance with exemplary embodiments.

FIG. 6 illustrates a computer system 600 in which embodiments of the present disclosure, or portions thereof, may be implemented as computer-readable code. For example, the processing server 102 of FIG. 1 may be implemented in the computer system 600 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3-5.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 618, a removable storage unit 622, and a hard disk installed in hard disk drive 612.

Various embodiments of the present disclosure are described in terms of this example computer system 600. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 604 may be a special purpose or a general purpose processor device specifically configured to perform the functions discussed herein. The processor device 604 may be connected to a communications infrastructure 606, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 600 may also include a main memory 608 (e.g., random access memory, read-only memory, etc.), and may also include a secondary memory 610. The secondary memory 610 may include the hard disk drive 612 and a removable storage drive 614, such as a floppy disk drive, a magnetic tape drive, an optical disk drive, a flash memory, etc.

The removable storage drive 614 may read from and/or write to the removable storage unit 618 in a well-known manner. The removable storage unit 618 may include a removable storage media that may be read by and written to by the removable storage drive 614. For example, if the removable storage drive 614 is a floppy disk drive or universal serial bus port, the removable storage unit 618 may be a floppy disk or portable flash drive, respectively. In one embodiment, the removable storage unit 618 may be non-transitory computer readable recording media.

In some embodiments, the secondary memory 610 may include alternative means for allowing computer programs or other instructions to be loaded into the computer system 600, for example, the removable storage unit 622 and an interface 620. Examples of such means may include a program cartridge and cartridge interface (e.g., as found in video game systems), a removable memory chip (e.g., EEPROM, PROM, etc.) and associated socket, and other removable storage units 622 and interfaces 620 as will be apparent to persons having skill in the relevant art.

Data stored in the computer system 600 (e.g., in the main memory 608 and/or the secondary memory 610) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 600 may also include a communications interface 624. The communications interface 624 may be configured to allow software and data to be transferred between the computer system 600 and external devices. Exemplary communications interfaces 624 may include a modem, a network interface (e.g., an Ethernet card), a communications port, a PCMCIA slot and card, etc. Software and data transferred via the communications interface 624 may be in the form of signals, which may be electronic, electromagnetic, optical, or other signals as will be apparent to persons having skill in the relevant art. The signals may travel via a communications path 626, which may be configured to carry the signals and may be implemented using wire, cable, fiber optics, a phone line, a cellular phone link, a radio frequency link, etc.

The computer system 600 may further include a display interface 602. The display interface 602 may be configured to allow data to be transferred between the computer system 600 and external display 630. Exemplary display interfaces 602 may include high-definition multimedia interface (HDMI), digital visual interface (DVI), video graphics array (VGA), etc. The display 630 may be any suitable type of display for displaying data transmitted via the display interface 602 of the computer system 600, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 608 and secondary memory 610, which may be memory semiconductors (e.g., DRAMs, etc.). These computer program products may be means for providing software to the computer system 600. Computer programs (e.g., computer control logic) may be stored in the main memory 608 and/or the secondary memory 610. Computer programs may also be received via the communications interface 624. Such computer programs, when executed, may enable computer system 600 to implement the present methods as discussed herein. In particular, the computer programs, when executed, may enable processor device 604 to implement the methods illustrated by FIGS. 3-5, as discussed herein. Accordingly, such computer programs may represent controllers of the computer system 600. Where the present disclosure is implemented using software, the software may be stored in a computer program product and loaded into the computer system 600 using the removable storage drive 614, interface 620, and hard disk drive 612, or communications interface 624.

The processor device 604 may comprise one or more modules or engines configured to perform the functions of the computer system 600. Each of the modules or engines may be implemented using hardware and, in some instances, may also utilize software, such as corresponding to program code and/or programs stored in the main memory 608 or secondary memory 610. In such instances, program code may be compiled by the processor device 604 (e.g., by a compiling module or engine) prior to execution by the hardware of the computer system 600. For example, the program code may be source code written in a programming language that is translated into a lower level language, such as assembly language or machine code, for execution by the processor device 604 and/or any additional hardware components of the computer system 600. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 600 to perform the functions disclosed herein. It will be apparent to persons having skill in the relevant art that such processes result in the computer system 600 being a specially configured computer system 600 uniquely programmed to perform the functions discussed above.

Techniques consistent with the present disclosure provide, among other features, systems and methods for processing votes in a public blockchain. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for processing votes in a public blockchain, comprising:

generating, by a processing server, an election reference and two or more candidate references, the election reference being a unique value associated with a current election, and each candidate reference being a unique value associated with a respective candidate in the current election;

generating, by the processing server, asymmetric cryptographic key pairs associated with the current election, a first asymmetric cryptographic key pair comprised of a master private key and a master public key and a second asymmetric cryptographic key pair comprised of a validation private key and a validation public key;

generating, by the processing server, a plurality of key components using the master private key;

storing, in a memory of the processing server, the plurality of key components;

deleting, from the processing server, the master private key following storage of the plurality of key components and prior to electronic transmission of the one or more registration blocks;

generating, by the processing server, at least one registration block for addition to a blockchain, wherein the at least one registration block is comprised of a block header, the election reference, the two or more candidate references, and the master public key of the current election;

electronically transmitting, by a transmitting device of the processing server, each generated registration block to one or more nodes associated with the blockchain;

receiving, by a receiving device of the processing server and after the at least one registration block is added to the blockchain, a plurality of voting messages, wherein each voting message is received over a network from a voter's personal electronic device, each voting message includes data encrypted with the master public key of the current election, the encrypted data comprised of at least a voter's vote, the election reference, a voter's voter reference, and one of the two or more candidate references;

regenerating, by the processing server, the master private key using the plurality of key components stored in the memory following receipt of the plurality of voting messages;

generating, by the processing server, at least one voting block for addition to the blockchain, wherein each of the at least one voting block is comprised of a block header and one or more second data values, wherein the one or more second data values in the at least one voting block includes the encrypted votes of the received voting messages;

electronically transmitting, by the transmitting device of the processing server, each generated voting block to one or more nodes associated with the blockchain;

receiving, by the processing server from the voter's personal electronic device after the at least one voting block has been added to the blockchain, a verification message that includes the election reference, a voter's public key, a block reference value of the most recent block added to the blockchain, and a digital signature of the most recent block reference added to the blockchain, the digital signature generated using a voter's private key;

validate, by the processing server, the digital signature using the voter's public key;

decrypting, by the processing server after voting for the election has concluded, the encrypted votes in the at least one voting block using the regenerated master private key of the current election; and posting to the blockchain, by the processing server, each decrypted vote and associated election reference, a validation public key, and the digital signature generated using the voter's private key.

2. The method of claim 1, wherein the votes included in the one or more data values in the at least one voting block are decrypted votes.

3. The method of claim 1, further comprising:
generating, by the processing server, the digital signature over the election reference, the two or more candidate references, and the master public key using the validation private key, wherein
the generated digital signature and validation public key are further included in the one or more data values included in the one or more registration blocks.

4. The method of claim 3, further comprising:
generating, by the processing server, a voting digital signature for each of the votes using the validation private key, wherein
the generated voting digital signature accompanies the respective vote in the one or more voting blocks.

5. The method of claim 1, wherein each vote further includes a voting nonce.

6. The method of claim 1, wherein the election reference is a hash value generated via application of a hashing algorithm.

7. The method of claim 1, wherein each candidate reference of the two or more candidate references is a blockchain address associated with the blockchain and generated using a corresponding public key.

8. The method of claim 1, wherein each of the voter references is a cryptographically unique value.

9. The method of claim 8, wherein each of the voter references is generated using the voter's public key of a cryptographic key pair.

10. A system for processing votes in a public blockchain, comprising:
a receiving device, and a transmitting device, and a memory of a processing server;
a generation module of the processing server configured to generate an election reference and two or more candidate references associated with a current election; and
an encryption module of the processing device configured to encrypt asymmetric cryptographic key pairs, a first key pair of the asymmetric cryptographic key pairs comprised of a master private key and a master public key and a second key pair of the asymmetric cryptographic key pairs comprised of a validation private key and a validation public key; wherein
the generation module of the processing server is further configured to generate a plurality of key components using the master private key;
the memory of the processing server is configured to store the plurality of key components;
the processing server is configured to delete the master private key following storage of the plurality of key components and prior to electronic transmission of the one or more registration blocks;
the generation module of the processing server is further configured to generate at least one registration block for addition to a blockchain, wherein the at least one registration block is comprised of a block header, the election reference, the two or more candidate references, and the master public key of the current election;
the transmitting device of the processing server is configured to electronically transmit each generated registration block to one or more nodes associated with the blockchain;
the receiving device of the processing server is configured to receive a plurality of voting messages after the at least one registration block is added to the blockchain, wherein each voting message is received from a voter's personal electronic device, each voting message includes data encrypted with the master public key of the current election, the encrypted data comprised of at least a voter's vote, the election reference, a voter's voter reference and one of the two or more candidate references;
the encryption module of the processing server is further configured to regenerate the master private key using the plurality of key components stored in the memory following receipt of the plurality of voting messages;
the generation module of the processing server is further configured to generate at least one voting block for addition to the blockchain, wherein each of the at least one voting block is comprised of a block header and one or more second data values, wherein the one or more second data values in the at least one voting block includes the encrypted votes of the received voting messages;
the transmitting device of the processing server is further configured to electronically transmit each generated voting block to one or more nodes associated with the blockchain;
the receiving device of the processing server is further configured to receive, after the at least one voting block has been added to the blockchain, a verification message that includes the election reference, a voter's public key, a block reference value of the most recent block added to the blockchain, and a digital signature of the most recent block reference added to the blockchain, the digital signature generated using a voter's private key;
the processing server being further configured to validate the digital signature using the voter's public key;
the encryption module of the processing server is further configured to decrypt, after voting for the election has concluded, the encrypted votes in the at least one voting block using the regenerated master private key of the current election; and
the processing server is further configured to post to the blockchain, each decrypted vote and associated election reference, a validation public key, and the digital signature generated using the voter's private key.

11. The system of claim 10, wherein
the votes included in the one or more data values in the at least one voting block are decrypted votes.

12. The system of claim 10, wherein
the digital signature is generated over the election reference, the two or more candidate references, and the master public key using the validation private key, and
the generated digital signature and validation public key are further included in the one or more data values included in the one or more registration blocks.

13. The system of claim 12, wherein
the encryption module of the processing server is configured to generate a voting digital signature for each of the votes using the validation private key, and
the generated voting digital signature accompanies the respective vote in the one or more voting blocks.

14. The system of claim 10, wherein each vote further includes a voting nonce.

15. The system of claim 10, wherein the election reference is a hash value generated via application of a hashing algorithm.

16. The system of claim 10, wherein each candidate reference of the two or more candidate references is a blockchain address associated with the blockchain and generated using a corresponding public key.

17. The system of claim 10, wherein each of the voter references is a cryptographically unique value.

18. The system of claim 17, wherein each of the voter references is generated using the voter's public key of an asymmetric cryptographic key pair.

* * * * *